UNITED STATES PATENT OFFICE 1,982,541

COLORING CONCRETE

Edward W. Scripture, Jr., Cleveland Heights, Ohio, assignor to The Master Builders Company, Cleveland, Ohio, a corporation of Ohio No Drawing. Application April 10, 1931,
Serial No. 529,312

11 Claims. (Cl. 106—24)

This invention relates to coloring concrete and has for its object the provision of an improved material for imparting attractive tints to artificial stone and mortar made by the use of Portland cement and independently of the employment of colored aggregates. The employment of pigments for coloring concrete is not new. These have sometimes been mixed dry with the dry ingredients and at other times mixed wet with the tempering liquid. The use of dry color is at present frowned on by most engineers because of the weakening effect ordinarily produced upon the ultimate product, due partly to the rather large amount of pigment required to produce a given color effect and partly to the difficulty of incorporating that pigment uniformly throughout the concrete, since any substantial amount of fine inactive material at any point reduces the strength of the mixture. The employment of a pigment suspended in the tempering liquid avoids most of these criticisms, but is itself difficult to produce, since it is hard, under field conditions, to mingle dry pigment uniformly with a liquid, while the paste colors heretofore used on the market have at the best been difficult to measure (being ordinarily used by weight) and sometimes liable to settle or harden in the can as well as to become dried out and caked on exposure.

The objects of the present invention are the provision of an improved type of coloring material for use in the tempering liquid, which material is not prone to settling or hardening in the package, or drying upon exposure; the provision of a substance which can be readily handled at all times, readily measured, easily mixed with the tempering liquid and uniformly disseminated in the concrete; the provision of a substance which shall not injure but rather augment the strength of the resultant stone; the provision of material of very great coloring power per unit weight of the essential material figured to the dry state; while further objects and advantages of the invention will become apparent as the description proceeds.

The present invention is based primarily upon the employment of gels or gelatinous precipitates for the purpose in view, preferably those gels or gelatinous precipitates which are themselves colored, although it is within my invention to fortify or modify their color by the use of other colored materials whose suspension in the liquid is assisted by the peculiar nature of this essential ingredient. Certain materials are precipitated from aqueous solution in the form of gelatinous precipitates, this being particularly true of the silicates and hydrated oxides, (sometimes called "hydroxides"), of certain metals among which are preeminently to be classed iron, chromium, copper, manganese and aluminum. Thus the addition of sodium silicate solution or sodium hydroxide solution to the solution of a chloride of any one of the above named metals will produce a gelatinous precipitate of more or less body depending upon the concentration of the solutions employed. With suitable concentrations of the silicate, the result of mixing the same is the production of a gelatinous mass which occupies the entire volume of the two initial liquids and which is ordinarily called a "gel", the thickness or viscosity of the same depending upon the concentration employed. At other concentrations and with the sodium hydroxide the resultant precipitate possesses insufficient rigidity to maintain its dispersion throughout the entire mass of liquid and hence gravitates in part toward the bottom of the containing vessel, but without the production of any definite level of separation from the supernatant liquid. This is sometimes termed a "gelatinous precipitate", although differing from the so-called "gel" only in respect of concentration and stiffness. Both forms of the precipitate can be mixed with excessive liquid to remove soluble constituents (common salt in the examples above suggested) and after washing will return substantially to their original volume. The result of the foregoing mixtures are to produce various substances and colors as follows:

Ferrous chloride plus sodium silicate= iron silicate (green).
Ferric chloride plus sodium silicate= iron silicate (yellow).
Chromium chloride plus sodium silicate= chromium silicate (green).
Manganese chloride plus sodium silicate= manganese silicate (flesh).
Copper chloride plus sodium silicate= copper silicate (blue).
Aluminum chloride plus sodium silicate= aluminum silicate (white).
Ferrous chloride plus sodium hydroxide= ferrous hydroxide (green).
Ferric chloride plus sodium hydroxide= ferric hydroxide (brown).
Chromium chloride plus sodium hydroxide= chromium hydroxide (green).
Manganese chloride plus sodium hydroxide= manganese hydroxide (brown).
Copper chloride plus sodium hydroxide= copper hydroxide (green).
Aluminum chloride plus sodium hydroxide= aluminum hydroxide (white).

The colored precipitates above mentioned can be disseminated directly in the tempering water for the production of colored concrete. They have the advantage over other materials of being immune to settling or hardening in the packages, or drying at open exposure. Of course they are less concentrated than a paste or dry pigment would be, and hence entail a larger expense for packages and for transportation, but this is more than offset by the saving in labor in their use and by the absence of any waste due to spoiled goods. By the addition of proper pigments, however, their coloring effect per unit volume can be substantially increased, while their gelatinous character substantially assists maintaining the added pigments in suspension. Thus the brown of the iron silicate can be fortified by the addition of finely ground iron sesquioxide etc., or a gel of one color can by modified by the addition of a pigment of another color as will be well understood by those skilled in the art; while gels like those of aluminum which have no color of their own can be employed by buoying up other pigments which would be overwhelmed by the stronger colors produced by the first named metals.

In all cases the use of a colloid-mill for producing the suspension produces unexpected results. By colloid-mill I mean a mill which acts upon the material passed therethrough to disseminate it throughout the liquid while imparting more or less thoroughly to the particles an electrostatic charge which maintains this dispersion. Numerous devices are known which will do this, generally characterized by a rapidly rotating metal element submerged in the liquid with which element the pigment or gel is brought in close rubbing or abrading contact. When such a gel is subjected to the action of a colloid-mill the stiffness of the same may be increased to such an extent as to impair the fluidity of the material. This is not always desirable in the case of the colored gels, especially such as are to be used without the addition of other pigment, inasmuch as dilution may be necessary to enable their use, which dilution would impair the coloring power; but is oftentimes advantageous to assist the buoying up of an added pigment, and especially in the case of a colorless gel, thereby enabling the latter to support a much larger amount of pigment than would otherwise be the case.

As examples of successful compositions and procedures, but without limiting intention I instance the following:

Example No. 1

(a) 4 lbs. ferrous sulphate in 1¼ gallons of water.
(b) 1 lb. sodium hydroxide in 1¼ gallons of water.

"b" is added to "a", with agitation the precipitate washed three or more times by decantation, allowed to settle and drained to a volume of 1¼ gallons. The resulting material may or may not be dispersed by passing thru the colloid mill. If used with a cement mortar in the proportion of 1 gallon to 100 lbs. of cement, a pleasing buff color is secured.

Example No. 2

(a) 4 lbs. ferrous sulphate in 1 gallon of water.
(b) 1 lb. sodium hydroxide in ½ gallon.

"b" is added to "a" with agitation, the precipitate washed by decantation and drained to a volume of 2½ gallons. 2½ lbs. of red iron oxide pigment are added to the gelatinous material and the mixture passed through a colloid or dispersion mill. Used with a cement mortar in the proportions of 1 gallon per 100 lbs. of cement, a reddish brown color is obtained.

Example No. 3

(a) 1 lb. chromium acetate in 1 gallon of water.
(b) 4 lbs. sodium silicate in 2 gallons of water.

"b" is added to "a" with agitation, the mixture allowed to age for several hours, washed by decantation and drained to a volume of 2½ gallons. The resulting gelatinous material may or may not be passed through the mill. Used with a cement mortar in the proportions of 1 gallon per 100 lbs. of cement a pleasing gray color is secured.

I do not limit myself to any proportion of pigment to gel or to any determined coloring effect since the amount necessary to be used depends upon concentration of the gel, the visual effect of the particular color, and the desires of the user as regards the result. The material is preferably employed by measure and may be standardized so that a gallon of the material will afford a reliable predetermined color to a given number of square feet of floor topping laid one inch thick. Likewise the specifications can be based upon the amount of cement used according to the desires of the user.

Having thus described my invention what I claim is:

1. Process of integrally coloring a hydraulic cement mix which contains the step of incorporating with the tempering water with which the ingredients are mixed, a naturally colored water-insoluble silicate gel.

2. Process of integrally coloring a hydraulic cement mix which contains the step of incorporating with the tempering water with which the ingredients are mixed, a finely divided mineral pigment having its particles dispersed and suspended in a water-insoluble silicate gel.

3. Process of integrally coloring a hydraulic cement mix which contains the step of incorporating with the tempering water with which the ingredients are mixed, a mineral pigment mixed with a water-insoluble colored silicate gel.

4. Process of coloring articles made essentially of Portland cement which contains the step of incorporating with the ingredients during their original mixing a composition of matter consisting of a mineral pigment mixed with and suspended in a water-insoluble silicate gel.

5. A composition of matter in the form of a free-flowing liquid for integrally coloring a hydraulic cement mix comprising a mineral pigment mixed with and suspended in a colored water-insoluble silicate gel, whereby the composition can be made and stored prior to its use without substantial change in its physical character.

6. The process of producing a colored cementitious article consisting essentially of a hydraulic cement of the Portland type which comprises the steps of putting a pigment and a gel together through a colloid mill whereby the stiffness of the gell is increased and it is capable of buoying up a large amount of pigment, incorporating such colored material with water, and then using such colored liquid as gauging liquid for a cement mix.

7. The method of producing an integrally colored cementitious article consisting essentially of a hydraulic cement of the Portland type which comprises the steps of combining a metallic salt and a silicate to form a water-insoluble colored gelatinous silicate of the metal, disseminating the silicate in water to form a colored liquid, and then tempering and coloring a cement mix with such liquid.

8. The method of producing an integrally colored cementitious article consisting essentially of a hydraulic cement of the Portland type which comprises the steps of mixing a metallic salt with the silicate of a metal to form a water-insoluble colored gelatinous silicate of the metal, adding a mineral pigment to the colored silicate and milling such mixture to comminute and suspend the pigment particles therein, thinning the milled mixture with water to form a colored liquid, and then tempering and coloring a cement mix with such liquid.

9. The method of producing an integrally colored cementitious article consisting essentially of a hydraulic cement of the Portland type which comprises the steps of mixing a metallic chloride with sodium silicate to form a gelatinous colored silicate of the metal, washing the resultant mixture to remove the soluble constituents, adding to the colored silicate a colored mineral pigment and putting the mixture through a colloid mill whereby the pigment particles are dispersed throughout and suspended by the silicate, adding water to the mixture of pigment and silicate to form a colored liquid, and then tempering and coloring a cement mix with such liquid.

10. A composition of matter for integrally coloring a hydraulic cement mix comprising a purified naturally colored metal silicate in the form of a gel having a finely divided mineral pigment mixed therewith.

11. A composition of matter in the form of a free-flowing liquid for integrally coloring a hydraulic cement mix comprising a silicate gel having a finely divided mineral pigment dispersed and suspended therein whereby the composition can be made and stored prior to its use without substantial change in its physical character.

EDWARD W. SCRIPTURE, Jr.